March 20, 1962 R. P. TURNER 3,025,606
LEAK LOCATOR METHOD AND APPARATUS
Filed April 9, 1958

INVENTOR.
ROLAND P. TURNER
BY
ATTORNEY

United States Patent Office 3,025,606
Patented Mar. 20, 1962

3,025,606
LEAK LOCATOR METHOD AND APPARATUS
Roland P. Turner, Sherwood Forest, Md.
(526 Melbourne Court, Charlotte, N.C.)
Filed Apr. 9, 1958, Ser. No. 727,384
4 Claims. (Cl. 33—125)

This invention relates to a leak locating method and apparatus and has been conceived for use specifically with a conduit or piping system, but the inventive concept is not limited to this specific application or combination.

The invention is illustrated and hereinafter described for use in and with an underground conduit or piping system. In such systems when a leak occurs in the conduit it has been heretofore practically impossible to pinpoint the position of the leak with the result that locating the leak and repairing it has been a time-consuming and costly operation because it has been necessary to dig up very considerable ground along the length of the buried conduit to find the leak point.

Accordingly the primary object of the invention is the provision of a unique method and apparatus or system for quickly localizing or pinpointing a leak in a length of underground conduit.

Other objects as well as advantages obtained by the practice of the method and the use of the apparatus will appear from the following description when read in the light of the accompanying drawing.

Underground conduits are used for housing pipes which transport all types of fluent material, the most common of course being some form of heating medium, although refrigerants as well as any form of fluent material to be conveyed from one point to another can flow through the pipe or pipes which are housed within the conduit. Inasmuch as the pipe or pipes are conveying a fluent material it is inevitable that at times a leak will occur at some point in the length of piping in the conduit or the conduits and the present invention is directed to a manner by which the exact point of leakage in the underground conduit can be quickly, easily and therefore more cheaply determined and located for repair.

Underground conduit and piping systems are in wide use and well known so that specific detailed description thereof is unnecessary. It is suffice to say that in a run of conduit there are a plurality of sections the number of which will be dependent upon the length of the conduit run as well as on other variables. Periodically along the length of the conduit run manholes are provided which permits a limited inspection of the conduit and the pipe or pipes therein. Conduit systems are built or layed to have an inclination to the horizontal from one of their ends to the other. Consequently if a leak develops in a section of conduit between a pair of manholes, water will run down the bottom of the conduit and collect in the first manhole on the lower side or end of the conduit section, and consequently an inspection of a manhole will reveal that there is a leak in a conduit section if such a leak has occurred.

Figure 1:
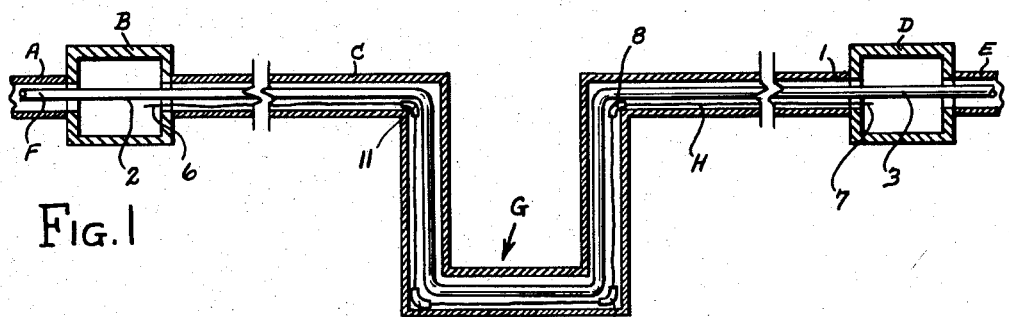
FIG. 1 is a transverse sectional view through a portion of the length of a conduit or piping run showing the improved invention in combination therewith.
Figure 2:
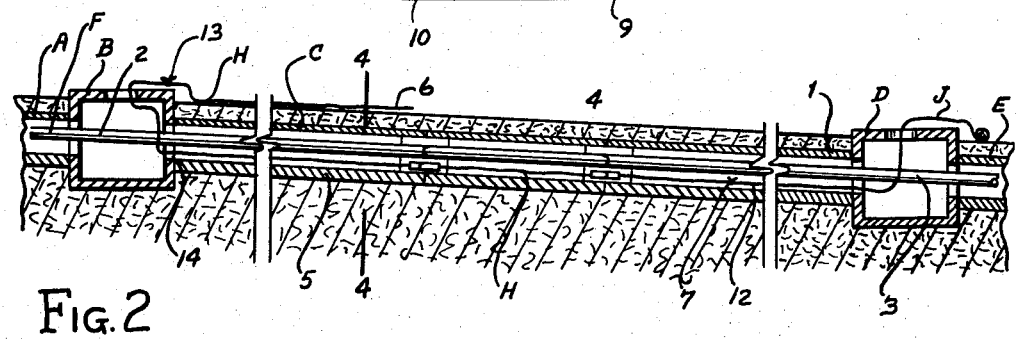
FIG. 2 is a vertical sectional view through the pipe run illustrated in FIG. 1.

Referring to FIGS. 1 and 2 which illustrate a conduit system having therein a single fluent conducting pipe, A is the lower end of a conduit section which terminates in a manhole B. A second conduit section C leads from manhole B and has its lower end 1 terminating in a manhole D from which leads another conduit section, an end E of which is illustrated. The fluent conducting pipe F is continuous throughout the length of the conduit and spans or passes through each of the manholes along the length of the conduit run, as illustrated at 2 and 3. As the fluent conducted by the pipe or pipes in a conduit is often either hot or cold in nature, it is necessary to provide periodically along the length of the conduit what is known as an "expansion loop." These loops can take one of any well known forms and in FIG. 1 of the drawings what is commonly referred to as a "hairpin" loop is illustrated and designated as an entirety by G. As will be seen, this loop is substantially a U-shaped turn in the pipe or conduit. Expansion loops being well known explanation of the operation thereof, which forms no part of the present invention, is unnecessary.

By reference to FIG. 2 it will be seen that the conduit is buried beneath the ground 4 and that the bottom 5 of the conduit is inclined downwardly looking from left to right of this figure of the drawing. Consequently if a leak occurred in the length of the conduit section C water would collect in the manhole D. The problem then would be to pinpoint the exact position of the leak in this length of conduit which might well be 200 or more feet in length.

The leak locator and the method of precisely locating the leak will now be described. It is to be understood that a leak locator would be associated with each section of conduit length, that is, with each run of conduit length between an upper and lower manhole.

The leak locator itself comprises an elongated flexible element in the nature of a string or cord, which would preferably be made of nylon, glass fibre or plastic fibre so that it would be non-rotting and hence have a longer life. This flexible element or cord would be impregnated chemically or with a chemical which would have the characteristic that the cord color would change upon being wetted. To enable repeated use of the cord or element it would preferably have the further characteristic that once the cord is wetted the cord would return to its original color upon being dried out. This cord or element, designated as an entirety by H, would be laid along the bottom of the conduit section C throughout the length thereof and have one end 6 extending into the manhole B and its lower and remote end 7 extending into the manhole D. Should a leak occur this cord or element is to be pulled upwardly above the ground through the manhole B, see FIG. 2, and to facilitate the movement of the cord through or around the expansion loop it would be desirable and advisable to pass it through guides 8, 9, 10 and 11. As it is also necessary to return this cord or to replace it with a like dry cord once the leak has been repaired, a supplemental cord or flexible element J is utilized. One end 12 of this cord is tied to the end 7 of the locator cord and will serve to pull the locator cord back through the conduit or as a lead cord to pull a replacement dry cord through the conduit.

The method practiced in locating a leak is extremely simple. Let it be assumed that an inspection of the manhole D reveals a flow of liquid or fluent thereinto. It is at once known that there is a leak in the conduit section C at some point between the manhole D and the manhole B. To determine the exact spot or point of this leak the locator cord or element is pulled upwardly through the manhole B until that point in the cord is reached where the cord color has changed due to having been wetted. Let it further be assumed, see FIG. 2, that the point designated 13 is the point of color change in the cord. This point 13 is then laid upon the ground or manhole top immediately above the upper end 14 of the conduit C. The unwetted and normally colored length of cord is then laid upon the ground immediately above the conduit from which it has been pulled. The end 6 of the locator cord will then indicate, in fact pinpoint, the point of leakage in the conduit, with the result that digging can be localized to this spot and the leak rapidly found and repaired. It will be understood that the supplemental cord J has been tied to the end 7 of the locator cord prior to pulling the cord from the conduit, as has previously been mentioned, so that the locator cord can be pulled back into the conduit, or if it is not dry a replacement cord can be tied to the remote end of the supplemental cord and pulled through the conduit.

Variations in the locator cord can be made without departing from the inventive concept. The cord could be chemically treated or impregnated at alternate points throughout its length rather than completely throughout its length and still function to locate the leak spot quickly and accurately. Such a periodically impregnated cord might prove advantageous from the standpoint of cost.

Figure 4:
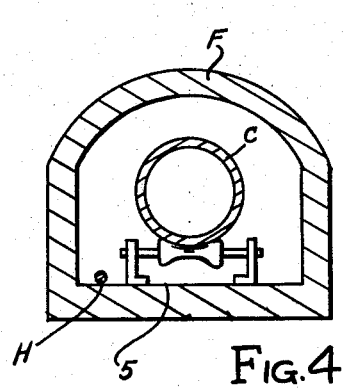
FIG. 4 is a vertical sectional view through a modified form of conduit.

The exact construction of the conduit does not play any part in the invention as it is suitable for use with conduits of many varying constructions. FIG. 4 illustrates one well known type of conduit.

Figure 3:
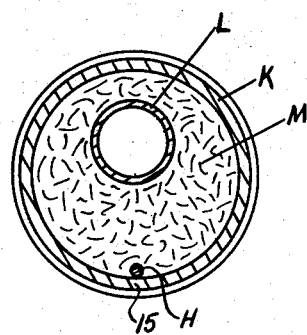
FIG. 3 is a vertical sectional view through one type of conduit.

FIG. 3 illustrates a round conduit K housing a fluent conducting pipe L. This conduit could be filled with a suitable insulating material M. The locator cord H would lie on the bottom 15 of the conduit.

Figure 5:
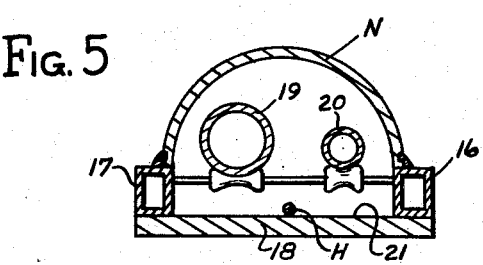
FIG. 5 is a vertical sectional view through a still further modified form of conduit.

FIG. 5 illustrates a further form of conduit having a semi-circular cover N supported on side blocks 16 and 17 which are in turn supported on a base 18. A pair of pipes 19 and 20 are housed by this conduit and the locator cord H lies on the bottom 21 of the conduit which is of course the inner upper face of the base 18.

The locator cord will operate irrespective of whether or not the conduits are interiorly filled with some suitable insulating material which it is more or less conventional to use in conduit systems where the pipe or pipes thereof are conducting either a heated or refrigerated fluid.

Departures can be made from the specific apparatus and method illustrated and described and the invention is to be limited only by the scope of the hereinafter following claims.

What I claim is:

1. The method of locating the linear position of a liquid leak in an underground conduit having a longitudinally downwardly inclined bottom and which encloses a liquid conveying pipe, comprising laying along the length of the bottom of the conduit an elongated element which has the characteristic of changing color upon being wetted, removing the dry normally colored length of the element from the high end of the conduit, then placing on the ground above the high end of the conduit that point of the wet portion of the element which meets the dry portion of the element, and finally laying the entire length of the dry portion of the element along the ground above the conduit and extending from the high end toward the low end thereof.

2. The method of locating the linear position of a liquid leak in an underground conduit having a longitudinally downwardly inclined bottom and which encloses a liquid conveying pipe, comprising laying along the length of the bottom of the conduit an elongated element which has the characteristic of changing color upon being wetted, then removing a portion of the length of the element from the conduit at a high point in the length of the conduit, removing a sufficient length of the element until a change point in the color of the element appears, then placing the color change point of the element on the ground at a point immediately above the high point of the conduit from which the portion of the length of the element was removed, and then laying the length of normally colored element which is exterior of the conduit along the ground above that length of the conduit from which the element was removed.

3. The method of locating the linear position of a liquid leak in an underground conduit having a longitudinally downwardly inclined bottom and which encloses a liquid conveying pipe, comprising laying along the length of the bottom of the conduit a cord which has the characteristic of changing color upon being wetted, then pulling the cord from the conduit at a high point in the length of the conduit, continuing to pull the cord from the conduit until a color change point in the cord is reached, then placing the color change point of the cord on the ground at a point immediately above the high point of the conduit from which the cord was pulled, and then laying the length of normal colored cord which has been pulled from the conduit along the ground above that length of conduit from which the cord was pulled.

4. The method of determining the location of a liquid leak in an underground conduit having a longitudinally inclined bottom between manholes and which houses a liquid conveying pipe, including the steps of laying along the conduit bottom an elongated flexible element having the characteristic of changing color upon being wetted, removing the element from the high end of the conduit, and measuring along the upper ground level contiguously of the conduit and from above the high end of the conduit a distance equal to the unchanged color length of the elongated element.

References Cited in the file of this patent

UNITED STATES PATENTS

| | | |
|---|---|---|
| 188,778 | Coil | Mar. 27, 1877 |
| 1,501,407 | Le Clair | July 15, 1924 |
| 1,776,942 | Deutsch | Sept. 30, 1930 |
| 1,866,743 | Abbott | July 12, 1932 |